(12) United States Patent
Suzuki et al.

(10) Patent No.: US 7,838,160 B2
(45) Date of Patent: Nov. 23, 2010

(54) HUMIDIFIER FOR FUEL CELL SYSTEM

(75) Inventors: Motohiro Suzuki, Saitama (JP); Toshikatsu Katagiri, Saitama (JP); Yoshio Kusano, Saitama (JP); Kenji Nagumo, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 1402 days.

(21) Appl. No.: 11/285,421

(22) Filed: Nov. 21, 2005

(65) Prior Publication Data
US 2006/0147774 A1    Jul. 6, 2006

(30) Foreign Application Priority Data
Nov. 24, 2004    (JP)    ............................. 2004-339354

(51) Int. Cl.
*H01M 8/04*    (2006.01)
*B01D 53/22*    (2006.01)

(52) U.S. Cl. ...................... 429/413; 429/414; 429/436; 96/8

(58) Field of Classification Search ....................... None
See application file for complete search history.

(56) References Cited

U.S. PATENT DOCUMENTS
2002/0039674 A1*    4/2002    Suzuki et al. ................. 429/30

FOREIGN PATENT DOCUMENTS
| JP | 2000-223139 | * | 8/2000 |
| JP | 2002-184440 | | 6/2002 |
| JP | 2003-156238 | | 5/2003 |

* cited by examiner

*Primary Examiner*—Jonathan Crepeau
(74) *Attorney, Agent, or Firm*—Fish & Richardson P.C.

(57) ABSTRACT

A humidifier of the present invention includes a humidifier main body for humidifying a second fluid, using a humidified first fluid discharged from a fuel cell; a head portion of which one end is connected to an end of the humidifier main body and the other end is connected to the fuel cell or a supply passage extending from the fuel cell, and which supplies the second fluid after humidification to the fuel cell; and a chamber for communicating a bottom portion of a humidified gas flow passage formed within the head portion.

5 Claims, 8 Drawing Sheets

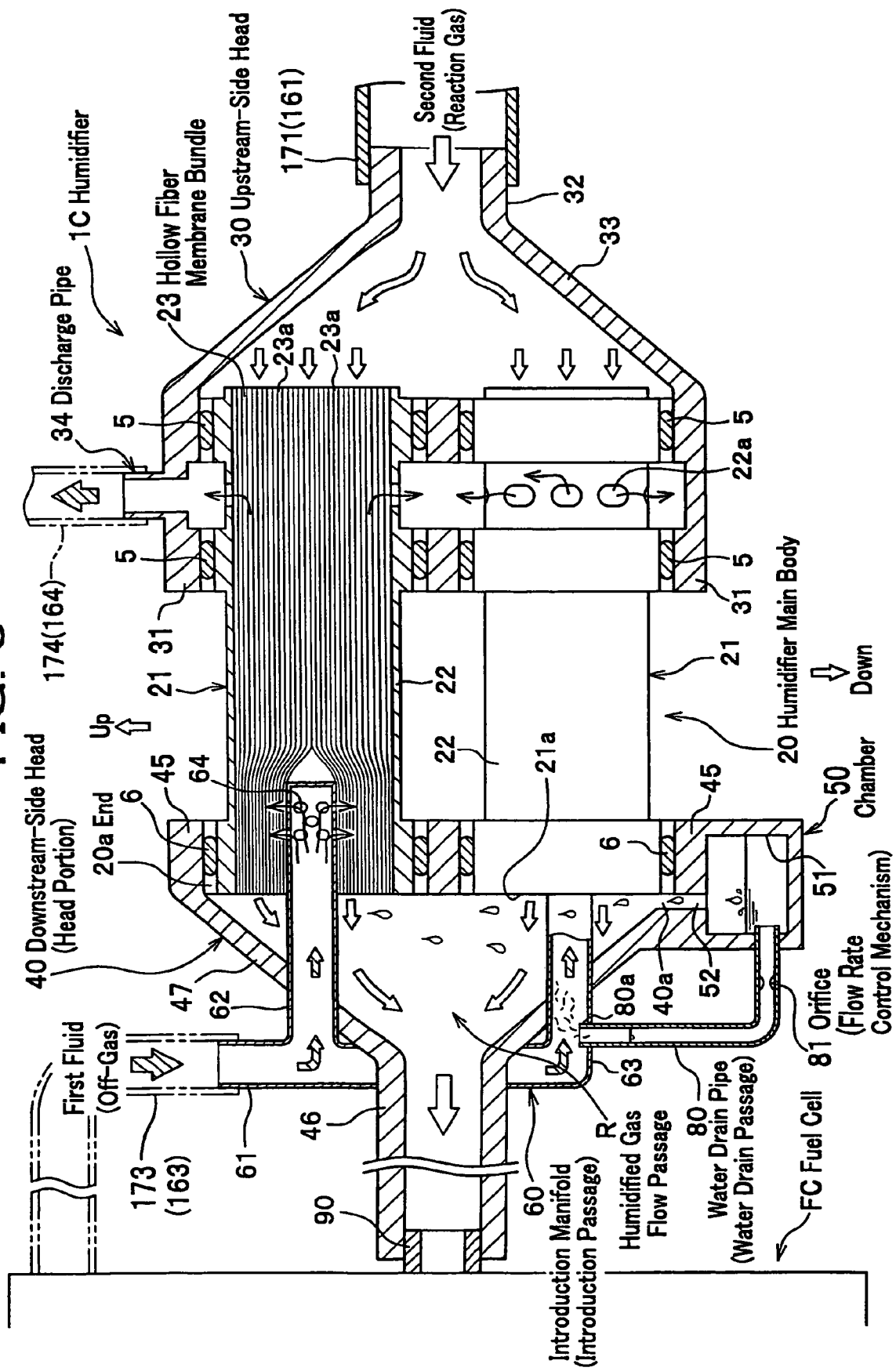

HUMIDIFIER FOR FUEL CELL SYSTEM

BACKGROUND OF THE INVENTION

1. Field of the Invention

The present invention relates to a humidifier for humidifying a dry fluid, using moisture in a humidified fluid.

2. Description of the Related Art

As a fuel cell for a fuel cell electric vehicle (FCEV) is generally adopted, for example, a PEM (Proton Exchange Membrane) type using a solid polymer as an electrolyte membrane because of a small size and light weight, high efficiency, and high power output thereof. An ion exchange membrane such as a fluorocarbon resin group cited as one of solid polymers functions as a proton conductive electrolyte membrane in a water containing state; however, in a dry state its proton conductivity lowers and it causes a lowering of a power output. Therefore, a fuel cell system equipped with this kind of a fuel cell is designed to humidify reaction gases (anode gas and cathode gas) supplied to an anode and cathode of the fuel cell by a humidifier so that an electrolyte membrane can maintain proper humidity.

Although a humidifier for humidifying the reaction gases is variously proposed, the humidifier is proposed which uses a hollow fiber membrane and humidifies the reaction gases by an off-gas discharged from a fuel cell because of no necessity of a water supply from outside and power, its comparatively simple structure, and the like (for example, see paragraph 0020 and FIGS. 3 and 4 in Japanese Patent Laid-Open Publication No. 2003-156238).

However, in the conventional humidifier, if the fuel cell system stops and the humidifier is cooled, the reaction gases humidified are cooled, thereby condensation water is produced, and the water accumulates in the vicinity of an outlet of the reaction gases of the humidifier. Therefore, if the fuel cell system is started in this state, the condensation water accumulated in the vicinity of the outlet flows toward the fuel cell provided at a downstream, as a result, a reaction face within the fuel cell, that is, an electrode face covering the outside of the electrolyte membrane is excessively covered by the condensation water, thereby it becomes difficult for the reaction gases to be supplied to the electrode face, and a power generation efficiency of the fuel cell lowers.

Consequently, a humidifier is strongly requested that can prevent condensation water accumulated in the vicinity of an outlet of the humidifier from flowing toward a fuel cell at start of a fuel cell system.

SUMMARY OF THE INVENTION

A humidifier of a first aspect of the present invention comprises a humidifier main body for humidifying a second fluid, using a humidified first fluid discharged from a fuel cell; a head portion of which one end is connected to an end of the humidifier main body and the other end is connected to the fuel cell or a supply passage extending from the fuel cell, and which supplies the second fluid after humidification to the fuel cell; and a chamber for communicating a bottom portion of a humidified gas flow passage formed within the head portion.

In accordance with the humidifier of the first aspect of the present invention, because it is enabled to accumulate water produced in the vicinity of an outlet of the humidifier main body after a stop of a fuel cell system, it is enabled to prevent the water from flowing toward the fuel cell and at a breath toward the fuel cell at start of the fuel cell system. In addition, the humidification of the second fluid is prompted by moisture accumulated within the chamber in an operation after the start of the fuel cell system.

In addition, the chamber may also be designed to comprise a water drain passage, wherein a flow rate adjustment mechanism is provided at the water drain passage. In accordance with the design, it is enabled to prevent water from overflowing from the chamber.

In addition, the water drain passage may also be designed to be communicated with an introduction passage for introducing the first fluid into the humidifier main body or a discharge passage for discharging the first fluid from the humidifier main body. In accordance with the design it is enabled to shorten piping and thereby to speedily unfreeze water even in a case that the water is frozen.

In addition, a humidifier of a second aspect of the present invention comprises a humidifier main body for humidifying a second fluid, using a humidified first fluid discharged from a fuel cell; and a head portion of which one end is connected to an end of the humidifier main body and the other end is connected to the fuel cell or a supply passage provided at the fuel cell, and which supplies the second fluid after humidification to the fuel cell, wherein a flow passage control member of a labyrinth structure is provided within the head portion upward from a bottom portion side of a humidified gas flow passage formed within the head portion.

In accordance with the humidifier of the second aspect of the present invention, because flow of water accumulated within the head portion is controlled by the flow passage control member, it is enabled to prevent the water from flowing toward the fuel cell and at a breath toward the fuel cell at start of the fuel cell system.

Furthermore, it is preferable that a gap of a predetermined size is formed between an edge facing the humidifier main body of the flow passage control member and an outlet portion of the second fluid of the humidifier main body. Thus because the second fluid after humidification discharged from the outlet portion of the humidifier main body flows in the flow-passage control member and the gap, it is enabled to prevent flow of the second fluid after humidification from being impeded.

In addition, an inside face of the head portion and at least one surface of the flow passage control member may be dispensed with a water repellent treatment. In a case of the water repellent treatment not being dispensed, produced water adheres to the inside face of the head portion and the surface of the flow passage control member, the water is apt to remain on a wall face, and there is a possibility that the water adhered to the inside face of the head portion and the surface of the flow passage control member flows at a breath toward the fuel cell at start of the fuel cell system; whereas in a case of the water repellent treatment being dispensed, it does not occur that the produced water remains as it adheres to the inside face of the head portion and the surface of the flow passage control member, and it becomes easier to drop the water till a bottom portion of the humidified gas flow passage within the head portion. Therefore, in the humidifier of the first aspect of the present invention comprising the chamber, it becomes easier to introduce water within the chamber; in the humidifier of the second aspect of the present invention comprising the labyrinth structure, it becomes easier to accumulate water at the bottom portion of the head portion. Thus it becomes enabled to prevent water from flowing toward the fuel cell at a breath at the start of the fuel cell system.

BRIEF DESCRIPTION OF THE DRAWINGS

FIG. 8 is a vertical section view of a humidifier of a third embodiment.

DESCRIPTION OF THE PREFERRED EMBODIMENTS

First Embodiment

Figure 1:
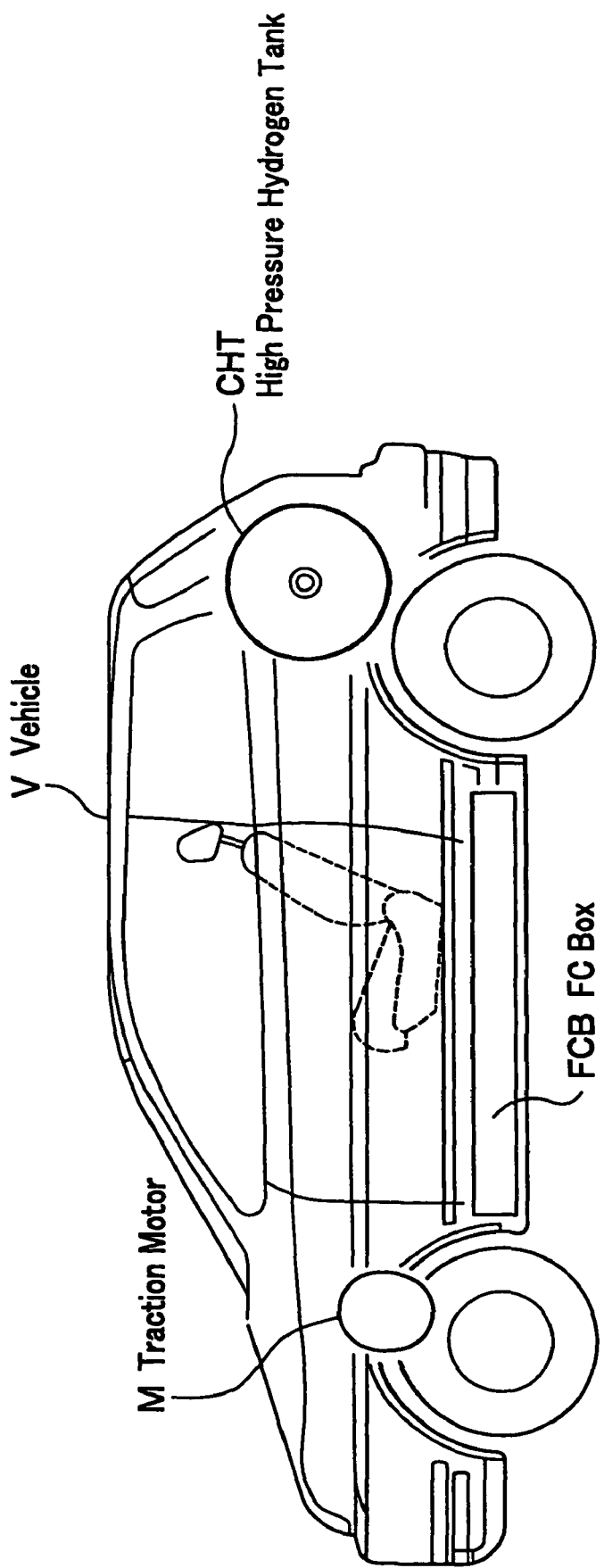
FIG. 1 is a partial perspective side view of a vehicle where a fuel cell system related to the present invention is mounted.
Figure 2:
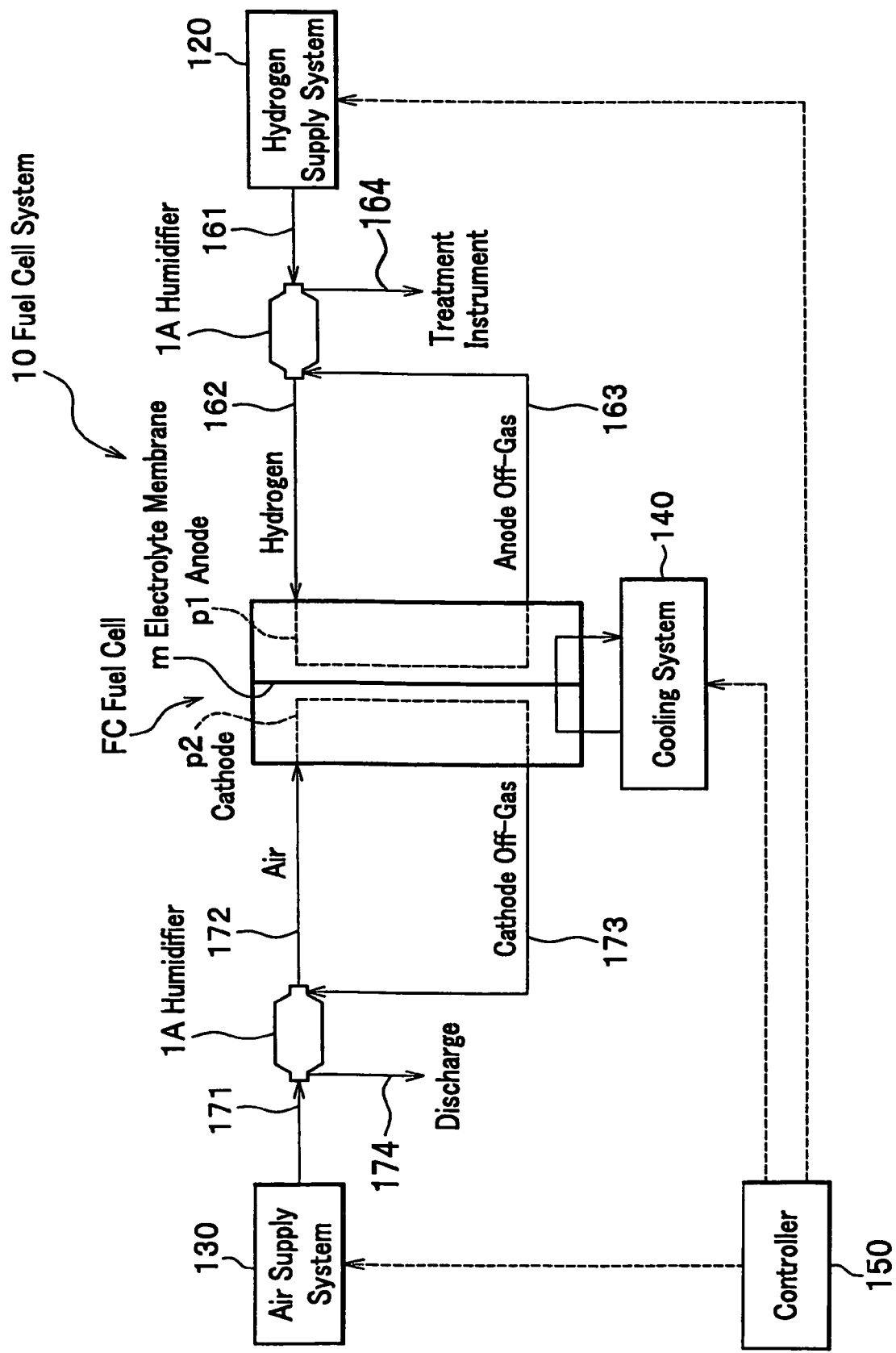
FIG. 2 is a block diagram showing a humidifier related to the present invention.
Figure 3:
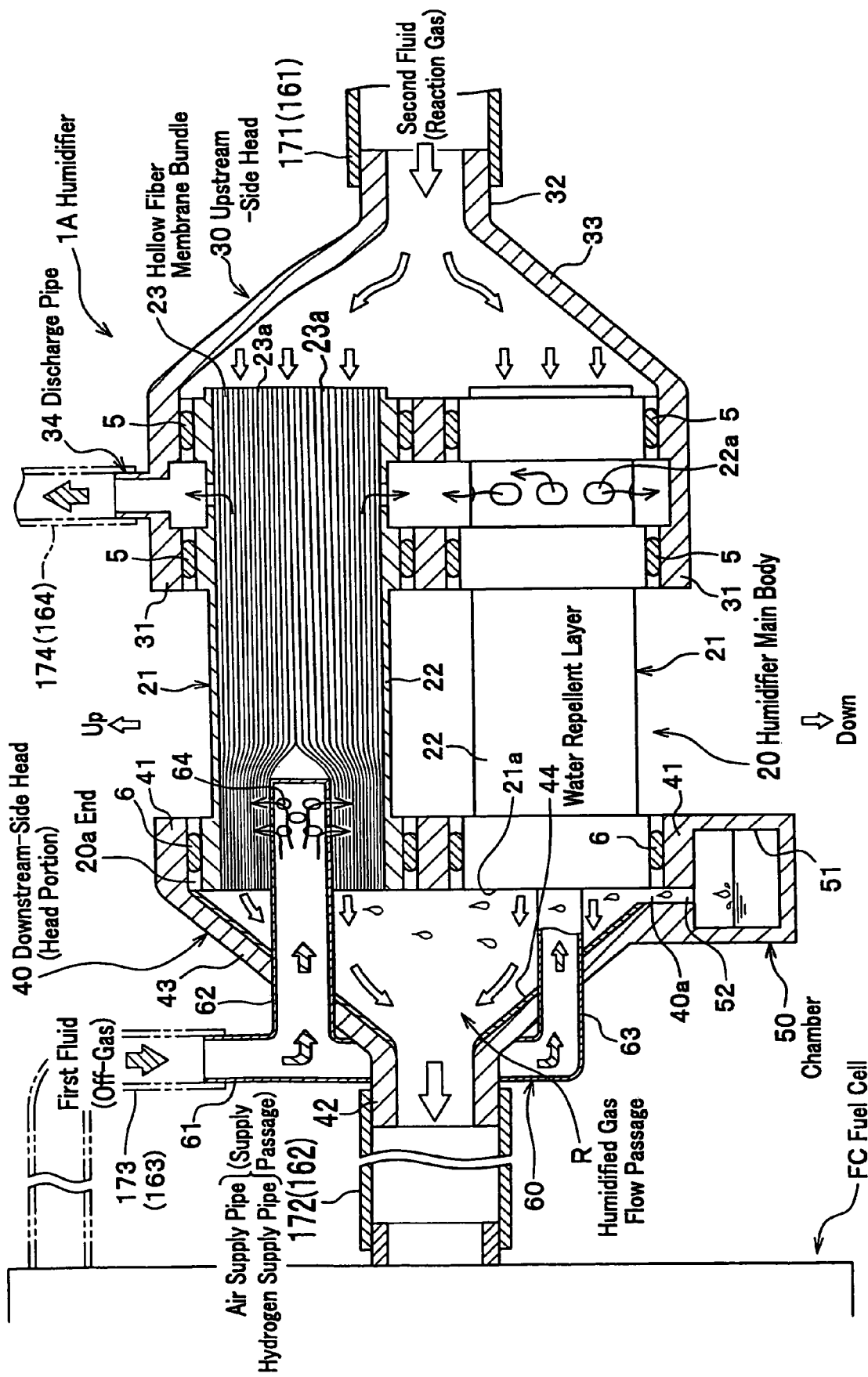
FIG. 3 is a vertical section view of a humidifier of a first embodiment.

FIG. 1 is a partial perspective side view of a vehicle where a fuel cell system related to the present invention is mounted. FIG. 2 is a block diagram showing a humidifier related to the present invention. FIG. 3 is a vertical section view of a humidifier of a first embodiment. Meanwhile, here will be described a case of the fuel cell system and the humidifier being mounted on a vehicle, the present invention is not limited thereto and is applicable to an airplane and a ship.

As shown in FIG. 1, in a vehicle V of the present invention a FC (fuel cell) box FCB is mounted below a floor of a passenger seat, and a fuel cell FC (see FIG. 2) is housed in the FC box FCB. In addition, in the vehicle V is mounted a traction motor M at a front portion of a vehicle body, and a high pressure hydrogen tank CHT is horizontally mounted above a rear wheel.

As shown in FIG. 2, a fuel cell system 10 mounted on the vehicle V comprises the fuel cell Fe, a hydrogen supply system 120, an air supply system 130, a cooling system 140, a controller 150, and two humidifiers 1A, 1A. Meanwhile, the humidifiers 1A, 1A of the present invention are not limited to a case that they are mounted at both of an anode p1 side and cathode p2 side of the fuel cell FC, the anode p1 side only or the cathode p2 side only is also available.

The fuel cell FC is the cell of a PEM type of a solid polymer, which the cell FC is configured by stacking a plurality of single cells, wherein in each single cell a membrane electrode assembly (MEA) is further sandwiched with a pair of conductive separators (not shown), and wherein the MEA is configured by an electrolyte membrane m being sandwiched with the anode p1 and the cathode p2 each of which contains a predetermined catalyser. If hydrogen (anode gas) is supplied to the anode p1 from the hydrogen supply system 120, and air (cathode gas) is supplied to the cathode p2 from the air supply system 130, the anode gas and the cathode gas electrochemically react, and thereby power is generated. Power (generation current) generated by the fuel cell FC is supplied to the traction motor M (see FIG. 1) and a load such as auxiliary equipment not shown.

The hydrogen supply system 120 supplies hydrogen as the anode gas to the anode p1 of the fuel cell FC, and comprises the high pressure hydrogen tank CHT (see FIG. 1), a pressure reducing valve, and the like.

The air supply system 130 supplies air as the cathode gas to the fuel cell FC, and comprises an air cleaner, an electric compressor, an intercooler, and the like.

The cooling system 140 discharges generated heat in the air, accompanied with the power generation of the fuel cell FC, and comprises a radiator, a circulation pump, and the like not shown.

The controller 150 comprises a CPU, a ROM, a RAM, a periphery circuit, an input/output interface, and the like not shown; and drives and controls the hydrogen supply system 120, the air supply system 130, the cooling system 140, and the like, based on various pieces of operation information detected by sensors not shown.

One of the humidifiers 1A, 1A at the anode p1 side is connected to the hydrogen supply system 120 through a hydrogen supply pipe 161 and to the fuel cell FC through a hydrogen supply pipe 162. In addition, the other one of the humidifiers 1A, 1A at the cathode p2 side is connected to the air supply system 130 through an air supply pipe 171 and to the fuel cell FC through an air supply pipe 172. In addition, to the humidifier 1A at the anode p1 side are connected an anode off-gas introduction pipe 163 from the fuel cell FC and an anode off-gas discharge pipe 164 for introducing an anode off-gas into a treatment instrument such as a dilution apparatus. In addition, to the humidifier 1A at the cathode p2 side are connected a cathode off-gas introduction pipe 173 from the fuel cell FC and a cathode off-gas discharge pipe 174 for discharging an cathode off-gas outside the vehicle V (or into the treatment instrument such as the dilution apparatus).

As shown in FIG. 3, each of the humidifiers 1A, 1A comprises a humidifier main body 20, an upstream-side head 30, a downstream-side head (head portion) 40, and a chamber 50.

In the humidifier main body 20 two hollow fiber membrane modules 21, 21 are disposed at upper and lower sides thereof. Each hollow fiber membrane module 21 is a same configuration and comprises a cylindrical case 22 and a hollow fiber membrane bundle 23 (hollow fiber membrane at a lower side not shown) housed within the case 22. The hollow fiber membrane bundle 23 is the bundle of a plurality of hollow fiber membranes 23a, and at both ends thereof, by adhesive are sealed gaps between outer perimeter faces of hollow fiber membranes 23a and those between the outer perimeter faces of the hollow fiber membranes 23a and an inner perimeter face of the case 22.

The upstream-side head 30 is formed of a material made of metal and the like, and comprises a pair of larger diameter hold portions 31, 31; a joint portion 32 smaller in diameter than the hold portions 31, 31 connected to the air supply pipe 171 (hydrogen supply pipe 161); and a diameter enlarging portion 33 for connecting the hold portions 31 to the joint portion 32. In the hold portions 31, 31 are inserted one ends of the hollow fiber modules 21, 21, respectively, and the modules 21, 21 are fixed at the hold portions 31, 31 through respective pairs of seal members 5, 5. In addition, at the hold portions 31, 31 is provided a discharge pipe (discharge passage) 34 for guiding the cathode off-gas (first fluid) outside the hollow fiber modules 21, 21, and the discharge pipe 34 is connected to the cathode off-gas discharge pipe 174 (anode off-gas discharge pipe 164). Meanwhile, on the outer perimeter face of each case 22 are formed a plurality of through holes 22a, and thus the cathode off-gas having passed through the outside of each hollow fiber membrane 23a is designed to flow in the discharge pipe 34 through the through holes 22a.

The downstream-side head (head portion) 40 is formed of a material made of metal and the like same as described above, and comprises a pair of larger diameter hold portions 41, 41; a joint portion 42 smaller in diameter than the hold portions 41, 41 connected to the air supply pipe 172 (hydrogen supply pipe 162); and a narrow-down portion 43 for connecting the hold portions 41, 41 to the joint portion 42. At the hold portions 41, 41 are respectively fixed the other ends of the hollow fiber modules 21, 21 through each seal member 6. In addition, on a surface within the narrow-down portion 43 of the downstream-side head 40 is laminated a water repellent layer 44 formed of, for example, such a fluorocarbon resin material. Meanwhile, in the embodiment an inner space surrounded by the narrow-down portion 43 of the downstream-side head 40 is designed to be a humidified gas flow passage R.

In addition, at the downstream-side head 40 is provided an introduction manifold 60. The manifold 60 comprises a connection pipe 61 where the cathode off-gas introduction pipe 173 (anode off-gas introduction pipe 163) extending from the fuel cell FC is connected; and a pair of upper/lower off-gas introduction pipes 62, 63 respectively fitted in the hollow fiber modules 21, 21. At tips of the off-gas introduction pipes 62, 63 are formed a plurality of small holes 64, respectively, and the cathode off-gas (anode off-gas) of the first fluid flows in the hollow fiber modules 21, 21 through the small holes 64. In addition, to the joint portion 42 of the downstream-side head 40 is connected the air supply pipe 172 (hydrogen supply pipe 162) extending from the fuel cell FC.

The chamber 50 comprises a space for accumulating water produced (condensed and the like) within the humidifier 1A and is integrally provided at a lower portion of the downstream-side head 40. The chamber 50 comprises a water reservoir 51 of a predetermined capacity and a communication passage 52, one end of the passage 52 is communicated with an upper portion of the water reservoir 51, and the other end of the passage 52 is communicated with a bottom portion 40a of the humidified gas flow passage R formed within the downstream-side head 40. Meanwhile, it is not necessary for the chamber 50 to be integrally provided with the downstream-side head 40, and the chamber 50 may also be separately provided.

Figure 4:
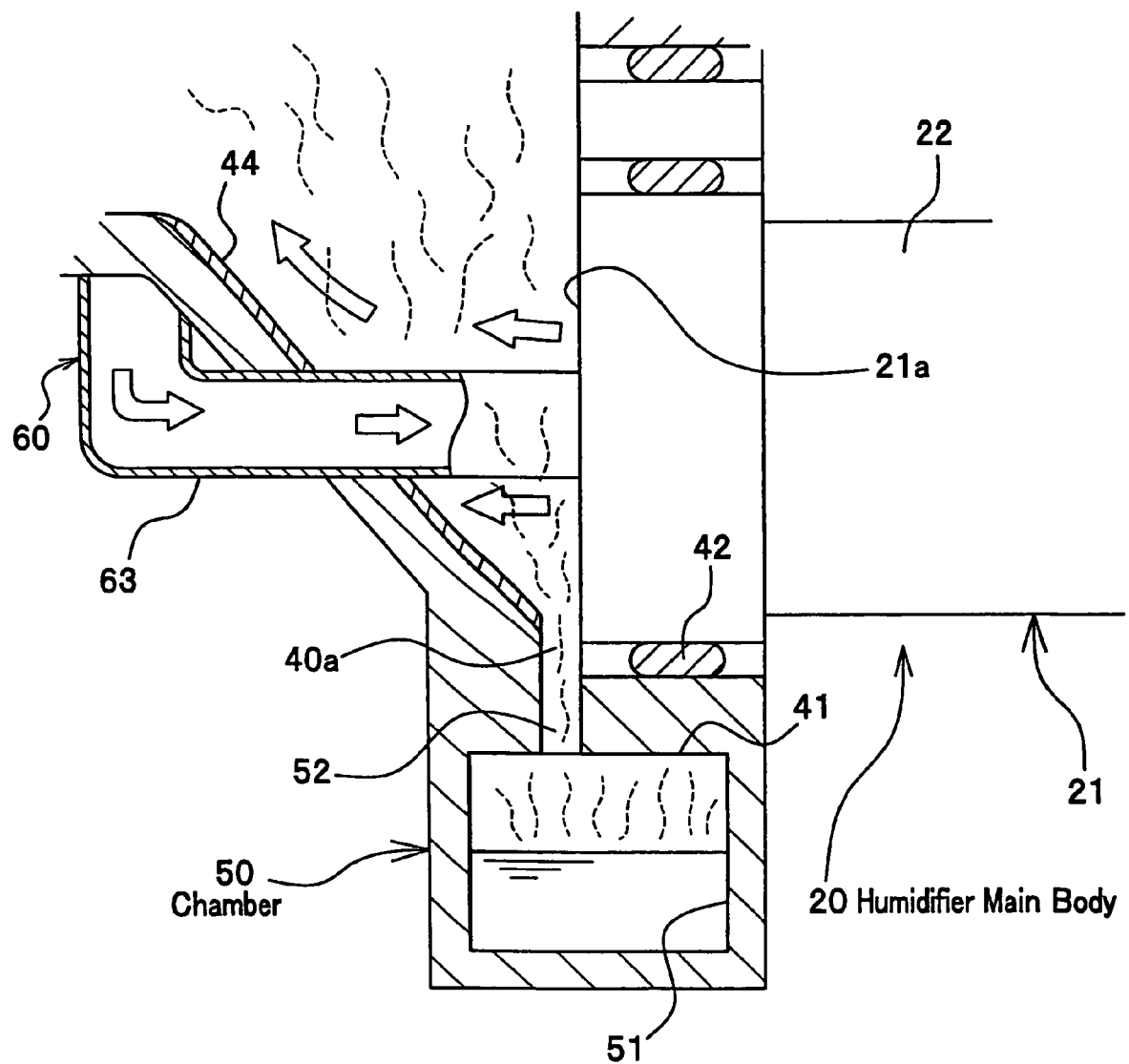
FIG. 4 is a partial enlarged section view showing another action of the humidifier of the first embodiment.

Next will be described an action of the humidifiers 1A, 1A of the first embodiment, referring to FIGS. 2 to 4. FIG. 4 is a partial enlarged section view showing another action of the humidifier 1A of the first embodiment.

If an ignition switch (not shown) of the vehicle V (see FIG. 1) is made an ON state by a driver, the controller 150 decides a target current value of the fuel cell FC as shown in FIG. 2, based on a step-on amount of a throttle pedal, consumption power of various instruments (lighting system, air conditioner, and the like), and the like, after then drives and controls the hydrogen supply system 120 and the air supply system 130 so as to supply an anode gas and a cathode gas to the fuel cell FC according to the target current value, and drives and controls the cooling system 140 according to a temperature of the fuel cell FC.

As shown in FIG. 2, if the fuel cell system 10 starts an operation, an anode gas (hydrogen) from the hydrogen supply system 120 is supplied to the anode p1 via one humidifier 1A, and a cathode gas (air) from the air supply system 130 is supplied to the cathode p2 via the other humidifier 1A. Thus at the anode p1 of the fuel cell FC is produced a hydrogen ion by action of a catalyser, and the hydrogen ion moves to the cathode p2 through the electrolyte membrane m. In addition, at the anode p1 is produced an electron when the hydrogen ion is produced, and the electron moves to the cathode p2 through an external load such as the traction motor M (see FIG. 1) and the like. The hydrogen ion and the electron that have moved to the cathode p2 react with oxygen in the air by action of a catalyser of the cathode p2, and thereby water is produced.

Thus power is generated in the fuel cell FC. Meanwhile, in the fuel cell FC the water produced at the cathode p2 side moves to the anode p1 side through the electrolyte membrane m according to such a pressure difference between the anode p1 and the cathode p2.

Accompanied with the power generation of the fuel cell system 10, a wet anode off-gas (first fluid) containing water is supplied to one humidifier 1A from the anode p1 of the fuel cell FC through the anode off-gas introduction pipe 163; a similarly wet cathode off-gas (first fluid) is supplied to the other humidifier 1A from the cathode p2 through the cathode off-gas introduction pipe 173.

In the humidifier 1A of the first embodiment the wet cathode off-gas (anode off-gas) from the cathode off-gas introduction pipe 173 (anode off-gas introduction pipe 163) flows inside the hollow fiber modules 21, 21 through the introduction manifold 60 and flows through outside of each hollow fiber membrane 23a as shown in FIG. 3, and after then, is discharged to the cathode off-gas discharge pipe 174 (anode off-gas discharge pipe 164) from the discharge pipe 34 provided at the upstream-side head 30. In addition, a dry cathode off-gas (anode gas) of the second fluid from the air supply pipe 171 (hydrogen supply pipe 161) flows through a hollow portion of each hollow fiber membrane 23a of the hollow fiber modules 21, 21, and after then, flows in the air supply pipe 172 (hydrogen supply pipe 162) from the downstream side head 40.

In the hollow fiber modules 21, 21 moisture in the cathode off-gas permeates the hollow fiber membrane 23a and moves to the hollow portion side of the membrane 23a according to a difference of a vapor partial pressure between the wet cathode off-gas (anode off-gas) and the dry cathode off-gas (anode off-gas), and thereby a cathode gas (anode gas) flowing through the hollow portion is humidified. As a result, the cathode gas (anode gas) sufficiently containing moisture is supplied to the cathode p2 (anode p1), and thus it is prevented that the power output of the fuel cell FC caused by drying of the electrolyte membrane m from being lowered.

On the other hand, if the ignition switch is made an OFF state and the temperature of the humidifier 1A is lowered, moisture in a cathode gas (anode gas) is condensed, and condensation water is produced. The produced condensation water directly drops toward the bottom portion 40a of the downstream-side head 40 (humidified gas flow passage R), and flows down toward the portion 40a of the head 40 via the surface of the water repellent layer 44 provided on the inside face of the narrow-down portion 43 of the head 40. Condensation water that has dropped till the bottom portion 40a of the downstream-side head 40 flows in the water reservoir 51 through the communication passage 52.

Thus because the condensation water produced within the downstream-side head 40 of the humidifier 1A for communicating the fuel cell FC can be accumulated in the water reservoir 51, it does not occur that a lower portion of the lower hollow fiber module 21 is submerged. Therefore, when the fuel cell system 10 is stopped and after then restarted, it is enabled to prevent condensation water from flowing toward the fuel cell FC and at a breath toward the fuel cell FC. Accordingly, because an electrode face (reaction face not shown) of the cathode p2 (anode p1) within the fuel cell FC results in not being covered with excessive water, it is enabled to prevent a power generation efficiency from being lowered.

Furthermore, in operation (power generation) of the fuel cell system 10 after its start, because the cathode gas of a higher pressure flows within the downstream-side head 40 toward the fuel cell FC, there occurs a negative pressure within the head 40 due to the flow of the cathode gas at this time. As a result, moisture (vapor) within the chamber 50 is sucked up through the communication passage 52 due to the negative pressure, humidification for the cathode gas is prompted. Accordingly, it is enabled to always maintain the electrolyte membrane m within the fuel cell FC at proper humidity.

In addition, in each of the humidifiers 1A, 1A of the first embodiment, as described above, because it does not occur that the lower portion of the lower hollow fiber module 21 is submerged by providing the chamber 50, for example, when condensation water is frozen, it does not occur that: the outlet portion 21a of the hollow fiber module 21 is occluded by the frozen condensation water; and a humidification force for the fuel cell FC (electrolyte membrane m) is damaged.

Second Embodiment

Figure 5:
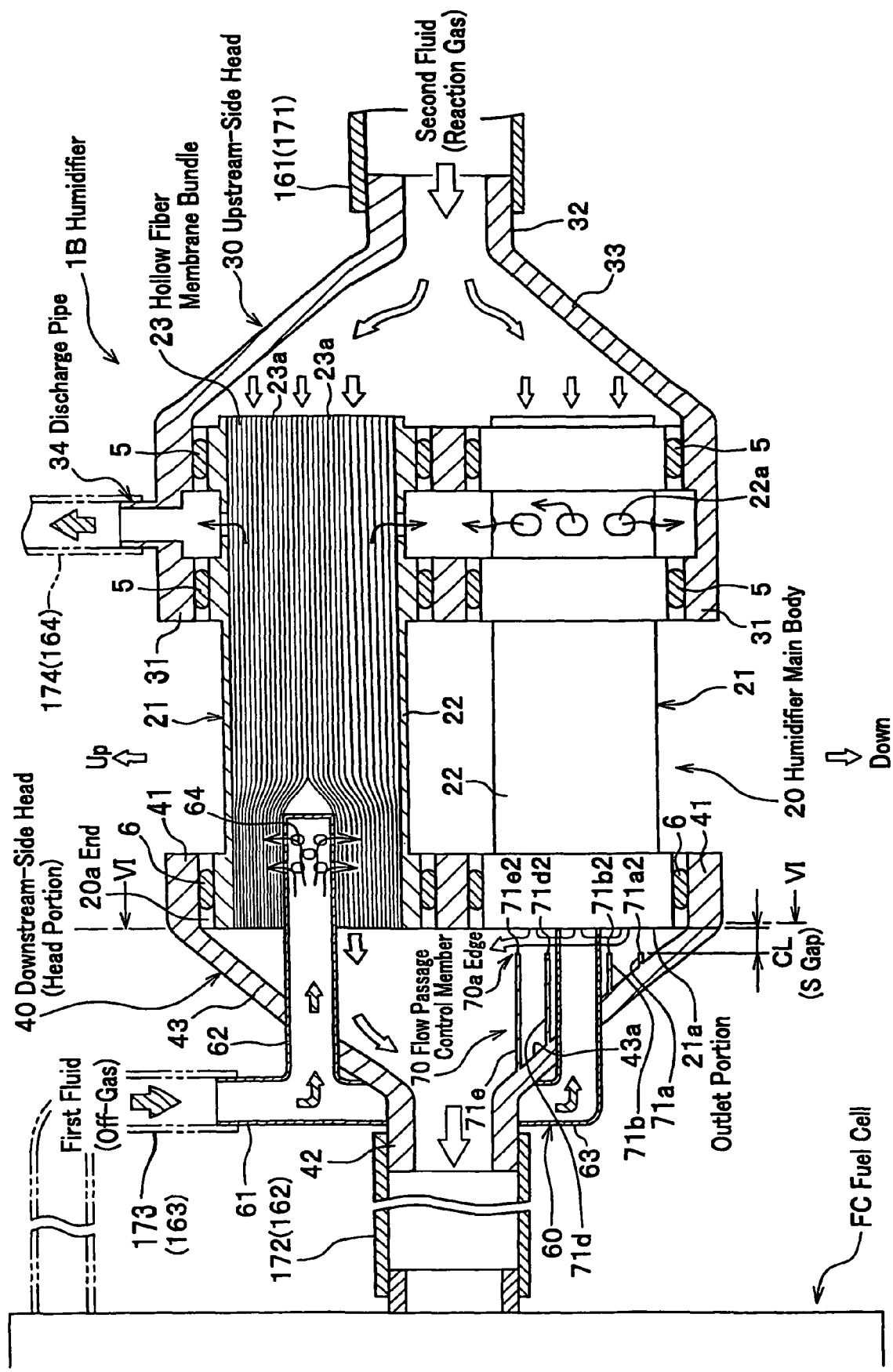
FIG. 5 is a vertical section view of a humidifier of a second embodiment.
Figure 6:
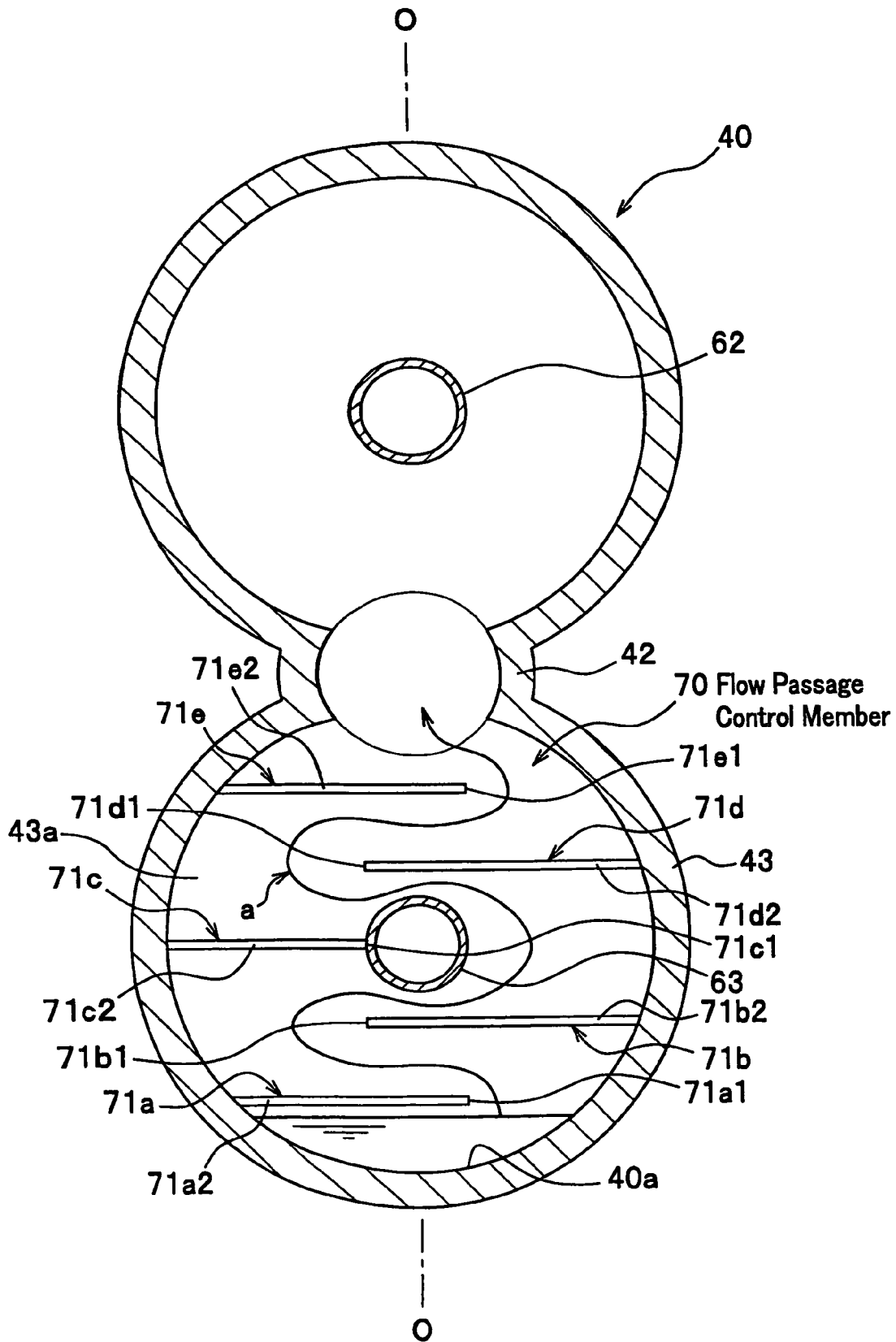
FIG. 6 is a section view of a VI-VI line in FIG. 5.

FIG. 5 is a vertical section view of a humidifier of a second embodiment. FIG. 6 is a section view of a VI-VI line in FIG. 5. A difference between the humidifier 1A and a humidifier 1B of the second embodiment exists in a point that a flow passage control member 70 of a labyrinth structure is provided within the downstream-side head 40 instead of the chamber 50. With respect to other configurations, appending same symbols as in the first embodiment, descriptions thereof will be omitted.

As shown in FIGS. 5 and 6, the flow passage control member 70 comprises partition plates 71a, 71b, 71c, 71d, and 71e (see FIG. 6). Each of the partition plates 71a to 71e is integrally provided with the downstream-side head 40 by a metal material at a position opposing the outlet portion 21a of one (lower) hollow fiber module 21 of the humidifier main body 20. The partition plate 71a extends in a horizontal direction (direction of the outlet portion 21a of the hollow fiber module 21, and same in the partition plates 71b to 71e) from an inner rim 43a of the narrow-down portion 43, and is formed so that a side end 71a1 of the partition plate 71a is positioned at shown right side more than a center line O-O. The partition plate 71b extends in the horizontal direction from the inner rim 43a of the narrow-down portion 43, and is formed so that a side end 71b1 of the partition plate 71b is positioned at shown left side more than the center line O-O. The partition plate 71c extends in the horizontal direction from the inner rim 43a of the narrow-down portion 43, and is formed so that a side end 71c1 of the partition plate 71c abuts with the off-gas introduction pipe 63 of the introduction manifold 60. The partition plates 71d and 71d are formed, same as the partition plates 71a and 71b, so that a side end 71d1 of the partition plate 71d is positioned at the left side more than the center line O-O and a side end 71e1 of the partition plate 71e is positioned at the right side more than the center line O-O. In the flow passage control member 70 thus formed a meandering passage a as shown in FIG. 6 is formed. In addition, as shown in FIG. 5, it is designed that a gap S of a predetermined size CL is formed between an edge 70a of the flow passage control member 70, that is, edges 71a2, 71b2, 71c2, 71d2, and 71e2 facing the hollow fiber module 21 of each partition plate 71a to 71e, and the outlet portion 21a of the module 21.

In the humidifier 1B thus formed, because condensation water accumulated at the bottom portion 40a of the humidified gas flow passage R formed within the downstream-side head 40 at a stop of the fuel cell system 10 (see FIG. 2) heads for the fuel cell FC as shown by an arrow mark of the meandering passage a meandered in FIG. 6, it is enabled to prevent the water from flowing toward the fuel cell FC and at a breath toward the fuel cell FC at start of the fuel cell system 10. In other words, even if water accumulated at the outlet portion 21a of the lower hollow fiber module 21 is blown up by a cathode gas (anode gas) of which supply is started at the start of the fuel cell system 10, it is enabled to prevent the water from flowing toward the fuel cell FC. In addition, in operation of the fuel cell system 10 after its start, because a cathode gas (anode gas) humidified with the humidifier main body 20 and heading for the fuel cell FC flows toward the cell FC through the gap S, it does not occur that the flow of the cathode gas is largely damaged. In addition, it is enabled for a cathode gas having invaded inside of the flow passage control member 70 to ascend while meandering therein and to flow toward the fuel cell FC.

Figure 7:
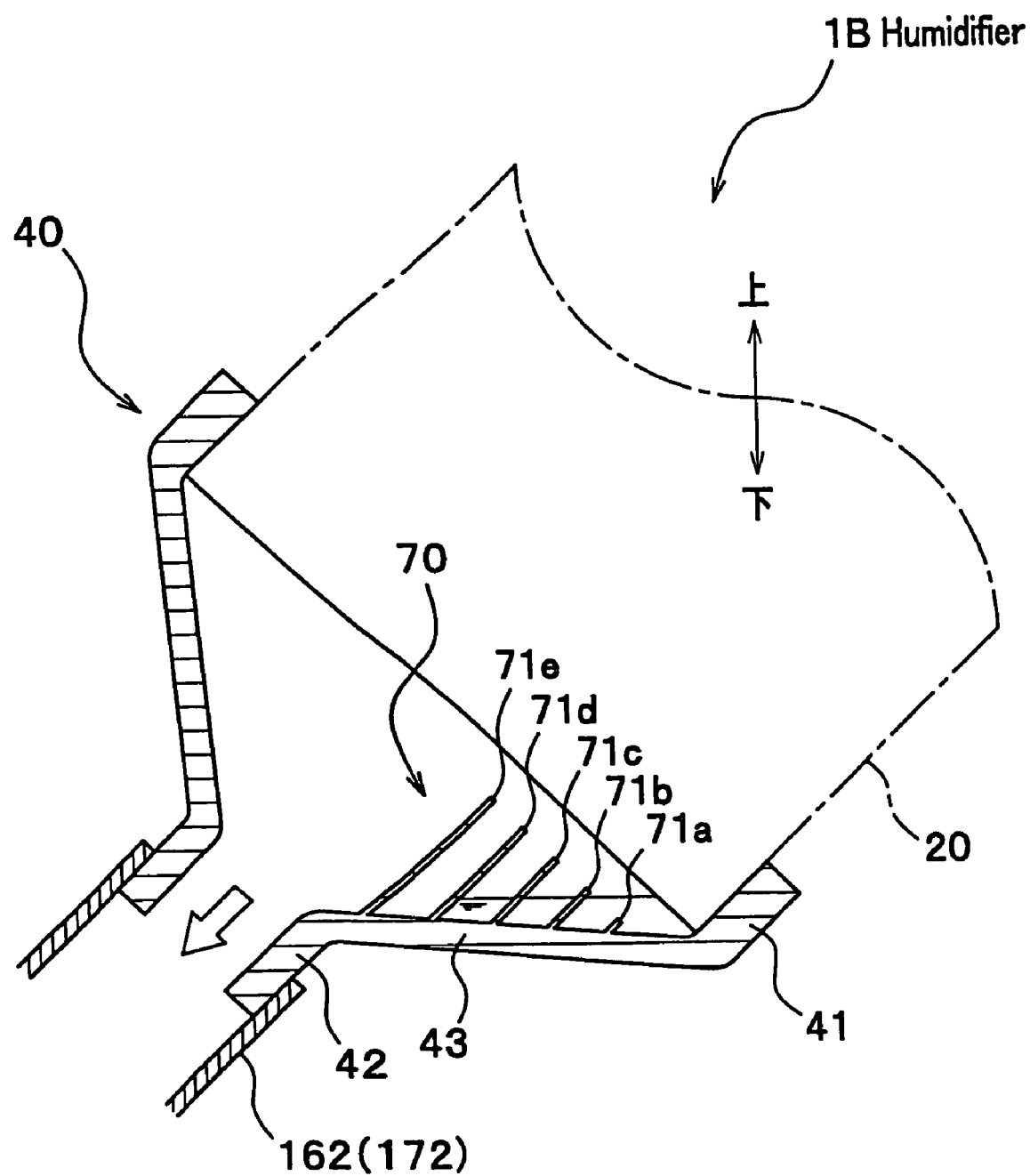
FIG. 7 is a section view showing one example of an action of the humidifier of the second embodiment.

FIG. 7 is a section view showing one example of an action of the humidifier 1B of the second embodiment. As shown in FIG. 7, in the humidifier 1B of the embodiment, because even if the vehicle V (see FIG. 1) is tilted and thereby the humidifier 1B is tilted, condensation water flows toward the fuel cell FC from the downstream-side head 40 while meandering by the partition plates 71a to 71e, it is enabled to prevent the condensation water from flowing toward the fuel cell FC at a breath.

Meanwhile, in the second embodiment, although five partition plates 71a to 71e are cited and described, the embodiment is not limited thereto; the plates may be less than five or not less than six. In addition, as shown in the first embodiment, the water repellent layer 44 may also be provided on the inside face of the downstream-side head 40, and both surfaces of the partition plates 71a to 71e or at least one surface thereof. In addition, each of the partition plates 71a to 71e is not limited to one extending in a horizontal direction, and may be tilted so as to descend toward the edges 71a2 to 71e2 and the side ends 71a1 to 71e1 from the inner rim 43a. Thus by tilting the partition plates 71a to 71e, it is enabled to speedily drop condensation water dropped from above the flow passage control member 70 till the bottom portion 40a without making the water stay on the plates 71a to 71e. Accordingly, it is enabled to prevent the condensation water from flowing toward the fuel cell FC at a breath at its start.

In addition, it may be designed that: at least one of the partition plates 71a to 71e and part of the one may be made a material such as a punching metal or a metal mesh; thereby a cathode gas (anode gas) is allowed to flow through any of the plates 71a to 71e; however, a water drop accompanied with the gas is not allowed (is separated) to flow therethrough. Thus it is enabled to further smooth the cathode gas (anode gas) having invaded the flow passage control member 70 to flow through the member 70.

Third Embodiment

FIG. 8 is a vertical section view of a humidifier of a third embodiment. A humidifier 1C of the third embodiment is a configuration where a water drain pipe (water drain passage) 80 comprises an orifice 81 functioning as a flow rate adjustment mechanism, and is added to the humidifier 1A of the first embodiment. In addition, in the third embodiment a configuration of a downstream-side head 40A is different from those of the first and second embodiments.

Whole of the downstream-side head (head portion) 40A is formed of a synthetic resin material, and comprises a pair of larger diameter hold portions 45, 45; a tube joint portion 46 smaller than the hold portions 45, 45 in diameter extending till a connection portion 90 provided at the fuel cell FC; and a narrow down portion 47 for connecting the hold portions 45, 45 to the joint portion 46. In other words, the downstream-side head 40A of the head portion is formed, integrally extending from an end of the humidifier main body 20 to the fuel cell FC.

The water drain pipe 80 is a communication pipe for communicating the water reservoir 51 provided in the chamber 50 with the off-gas introduction pipe 63 of the introduction manifold (introduction passage) 60, and a tip 80a of the pipe 80 of which side is connected to the pipe 63 penetrates a lower face of the pipe 63, and protrudes inside the pipe 63. Thus by providing the water drain pipe 80, because a pressure of a cathode gas is higher than that of a cathode off-gas, water within the chamber 50 is pushed up to side of the off-gas introduction pipe 63 through the pipe 80, and sucked by negative pressure and discharged, it is enabled to prevent water from overflowing within the downstream-side head 40A. In addition, protruding the tip 80a of the water drain pipe 80 within the off-gas introduction pipe 63, it is enabled to prevent moisture contained in an off-gas introduced into the pipe 63 from flowing back to the water reservoir 51 of the chamber 50.

The orifice 81 is designed so that an orifice diameter thereof becomes larger than a diameter of each permeation hole formed at the hollow fiber membranes 23a configuring the hollow fiber membrane bundle 23; and an hole diameter of an air cleaner (filter) of the air supply system 130. Thus setting the orifice diameter a predetermined diameter, it is enabled to prevent the orifice 81 from being occluded with minute foreign matters that permeate the hollow fiber membranes 23a and cannot be caught by the air cleaner. Meanwhile, the flow rate adjustment mechanism is not limited to the orifice 81, and a valve and the like are also available. In addition, a girth of the water drain pipe 80 may also be designed to be smaller. In this connection, in a case that water is not accumulated within the chamber 51, the orifice 81 plays a role of impeding (decreasing) a cathode gas (anode gas) from entering in a cathode off-gas (anode off-gas) not via the fuel cell FC.

Meanwhile, in the humidifier 1C of the embodiment, although the water drain pipe 80 is designed to be communicated with the introduction manifold 60 (off-gas introduction pipe 63), it may also be designed to be communicated with the side of the discharge pipe (discharge passage) 34. In addition, as a back flow prevention mechanism at the water drain pipe 80 may also be provided any of a back flow prevention lid and a check valve instead of a structure of protruding the tip 80a. In addition, as shown in the first embodiment, the water repellent layer 44 may also be laminated on an inside face of the downstream-side head 40A so that condensation water speedily drops within the chamber 50. In addition, the downstream-side head 40A may also be the downstream-side head 40 described in the first and second embodiments.

In addition, the humidifier of the present invention is not limited to the first to third embodiments, and it is also available that a humidifier main body comprises any of a single hollow fiber module and not less than three hollow fiber modules. In addition, in the forms of the downstream-side heads (head portions) 40, 40A, it is also available that the narrow-down portions 43, 47 does not have the forms of the tilted faces but those of upright faces, respectively.

The present invention thus described is not limited to each of the embodiments, and for example, the invention may also be designed so that an off-gas (first fluid) flows in the hollow portion of the hollow fiber membrane 23a and a dry reaction gas (second fluid) flows outside the membrane 23a. In each of the embodiments it is enabled to appropriately select and apply any of the chamber 50 and the flow passage control member 70 of a labyrinth structure. In addition, the above is also same for the water repellent layer 44 (see FIG. 1).

What is claimed is:

1. A humidifier comprising:
   a humidifier main body for humidifying a second fluid, using a humidified first fluid discharged from a fuel cell, the main body comprising a hollow fiber module having an outlet portion of the second fluid; and
   a head portion of which one end is connected to an end of said humidifier main body and the other end is connected to said fuel cell or a supply passage provided at said fuel cell, and which supplies said second fluid after humidification to said fuel cell,
   wherein within said head portion a meandering passage formed by partition plates extending in a direction of the outlet portion of said second fluid in the hollow fiber module is provided at a position facing said hollow fiber module, and
   wherein a gap of a predetermined size is formed between edges of the partition plates facing the humidifier main body and the outlet portion of the second fluid of the humidifier main body.

2. The humidifier according to claim 1 wherein said partition plates are tilted downward toward the outlet portion of said second fluid.

3. The humidifier according to claim 1 wherein at least a part of said partition plates includes a punching metal or a metal mesh configured to allow said second fluid to flow through any of said partition plates and not to allow accompanied water to flow through any of said partition plates.

4. The humidifier according to claim 1 wherein at least one of an inner face of said head portion or surfaces of said partition plates is treated with a water repellent treatment.

5. The humidifier according to claim 1 mounted in a vehicle.

* * * * *